(12) United States Patent
Manabe (10) Patent No.: US 10,006,492 B2
(45) Date of Patent: Jun. 26, 2018

(54) VACUUM PUMP

(71) Applicant: Shimadzu Corporation, Kyoto (JP)

(72) Inventor: Masashi Manabe, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days. days.

(21) Appl. No.: 15/425,199

(22) Filed: Feb. 6, 2017

(65) Prior Publication Data

US 2017/0227055 A1 Aug. 10, 2017

(30) Foreign Application Priority Data

Feb. 9, 2016 (JP) ................ 2016-022933

(51) Int. Cl.
| | |
|---|---|
| *F16C 33/66* | (2006.01) |
| *F04D 19/04* | (2006.01) |
| *F04D 29/059* | (2006.01) |
| *F04D 29/063* | (2006.01) |
| *F16C 19/16* | (2006.01) |
| *F04D 29/66* | (2006.01) |

(52) U.S. Cl.
CPC ........ *F16C 33/6648* (2013.01); *F04D 19/042* (2013.01); *F04D 29/059* (2013.01); *F04D 29/063* (2013.01); *F04D 29/668* (2013.01); *F16C 19/16* (2013.01); *F16C 33/6659* (2013.01); *F16C 33/6685* (2013.01); *F16C 2202/10* (2013.01); *F16C 2360/45* (2013.01)

(58) Field of Classification Search
CPC .............. F16C 33/6648; F16C 33/6659; F16C 33/6685
See application file for complete search history.

(56) References Cited

U.S. PATENT DOCUMENTS

| | | | |
|---|---|---|---|
| 4,181,379 A * | 1/1980 | Letts .................. | F16C 33/6648 384/465 |
| 8,202,005 B2 | 6/2012 | Koch et al. | |
| 2016/0097398 A1* | 4/2016 | Waye .................. | F04D 19/042 415/110 |

FOREIGN PATENT DOCUMENTS

JP 5303137 B2 6/2013

* cited by examiner

*Primary Examiner* — Thomas R Hannon
(74) *Attorney, Agent, or Firm* — Renner Otto Boisselle & Sklar, LLP (57) ABSTRACT

A vacuum pump comprises: a bearing device; and an exhaust function including a rotary body supported by the bearing device and configured to exhaust gas. The bearing device includes a bearing having an outer ring, an inner ring, and a rolling body, a lubricant storage configured to store lubricant, a lubricant supply structure configured to supply, to the bearing, the lubricant stored in the lubricant storage, a holding member configured to hold the bearing, and a porous body disposed outside the outer ring of the bearing and filled with the lubricant supplied from the lubricant supply structure to the bearing.

9 Claims, 10 Drawing Sheets

VACUUM PUMP

BACKGROUND OF THE INVENTION

1. Technical Field

The present invention relates to a vacuum pump.

2. Background Art

It is required for a rolling bearing rotating at high speed that lubrication of a rolling surface is maintained by continuous supply of a slight amount of lubricant and that adhesion of excessive lubricant to the rolling surface is prevented. When more lubricant than necessary for lubrication adheres to the rolling surface, agitation resistance of the lubricant is caused, leading to heat generation.

A structure described in Patent Literature 1 (Japanese Patent No. 5303137) has been proposed as a bearing device in a vacuum pump. In the bearing device described in Patent Literature 1, lubricant is, through a wick, supplied from a lubricant storage to an inclined outer peripheral surface of a spray nut having a conical surface. The lubricant supplied to the inclined outer peripheral surface of the spray nut moves upward on the inclined surface in association with rotation of the spray nut, and then, is supplied to a rolling bearing held by a bearing holder. Of the lubricant supplied to the rolling bearing, excessive lubricant is guided to a clearance formed between the bearing holder and an outer ring of the rolling bearing, and then, returns to the lubricant storage. The outer ring of the rolling bearing is held by an axial floating ring and a radial floating ring.

In the above-described lubricant supply type bearing device, the amount of lubricant supplied to the bearing is preferably a minimum amount to prevent unnecessary heat generation due to lubricant agitation in the bearing. The bearing device described in Patent Literature 1 is configured on the assumption that the amount of lubricant supplied to the rolling bearing becomes excessive. For this reason, when the amount of lubricant supplied to the rolling bearing is the minimum amount, the effect of releasing, to the outside, friction heat caused between the rolling body and the rolling surface in the bearing by heat transfer of the bearing is lowered, and therefore, there is a probability that a sufficient heat dissipation effect cannot be obtained.

SUMMARY OF THE INVENTION

A vacuum pump comprises: a bearing device; and an exhaust function including a rotary body supported by the bearing device and configured to exhaust gas. The bearing device includes a bearing having an outer ring, an inner ring, and a rolling body, a lubricant storage configured to store lubricant, a lubricant supply structure configured to supply, to the bearing, the lubricant stored in the lubricant storage, a holding member configured to hold the bearing, and a porous body disposed outside the outer ring of the bearing and filled with the lubricant supplied from the lubricant supply structure to the bearing.

The porous body includes at least one of a first portion disposed outside the outer ring of the bearing in an axial direction thereof, or a second portion disposed outside the outer ring in a radial direction thereof.

The porous body includes an interconnected pore, and a heat transfer path continuously formed from an inner surface to an outer surface of the porous body is formed by the lubricant filling the interconnected pore.

The porous body is made of a material having a higher coefficient of thermal conductivity than that of the outer ring of the bearing.

The vacuum pump further comprises: one or more dampers provided between the outer ring of the bearing and the holding member. A stiffness of a structure including the porous body, the bearing, and the damper is 100 to 1000 N/mm in the axial direction and 50 to 500 N/mm in the radial direction.

The porous body includes a porous coating provided on at least one of at least part of an outer surface of the outer ring of the bearing or at least part of a surface of the holding member facing the outer ring of the bearing.

A plurality of oil discharge paths are formed at the outer ring of the bearing.

The porous body is made of sintered metal.

The porous body is made of polyurethane, and the porous body is made in such a manner that the density of interconnected pore type urethane foam formed with 50 to 100 pores/in is increased to several times by hot pressing, and then, the resultant is processed into a predetermined shape.

According to the present invention, heat generated at the bearing can be effectively transferred to the outside of the bearing.

DETAILED DESCRIPTION OF THE EXEMPLARY EMBODIMENTS

Hereinafter, embodiments of the present invention will be described with reference to the drawings.

First Embodiment

Figure 1:
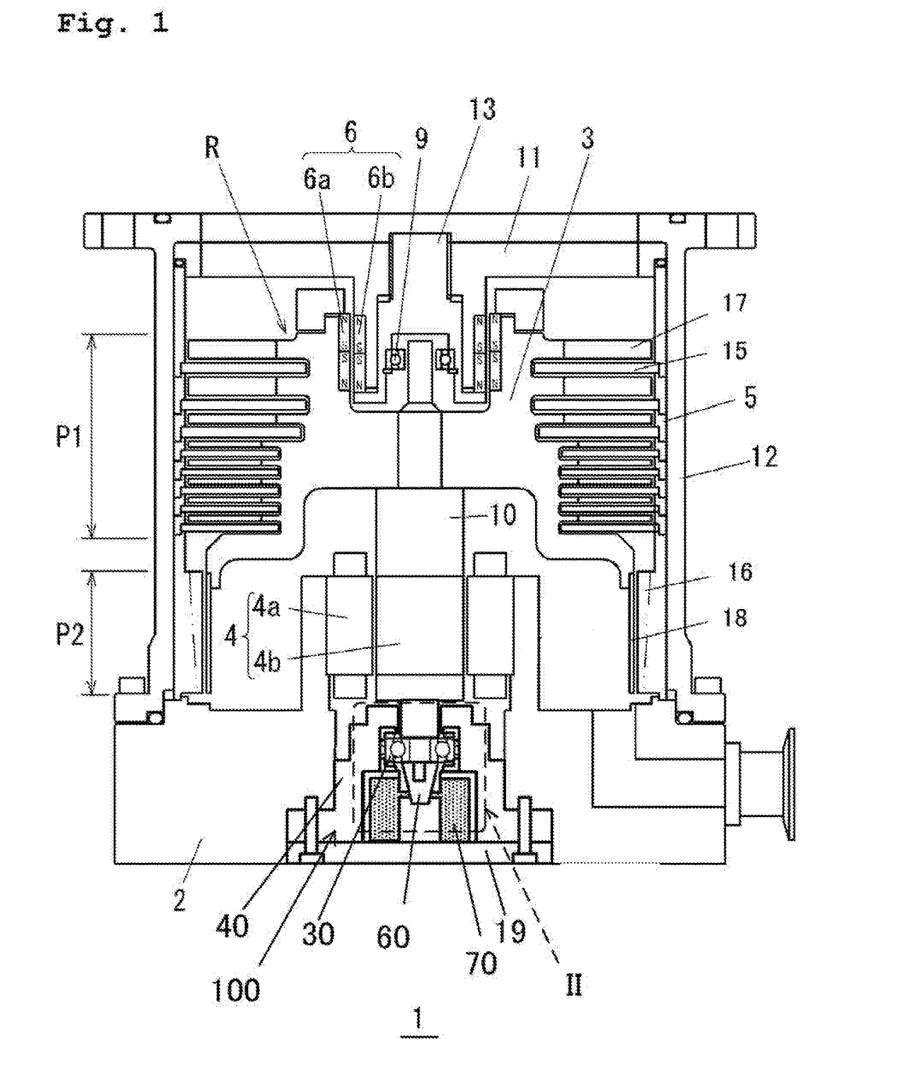
FIG. 1 is a view of a first embodiment of a vacuum pump of the present invention.

FIG. 1 is a view of a first embodiment of a vacuum pump of the present invention, and is a cross-sectional view of a turbo-molecular pump 1. Note that a power supply unit configured to supply power is connected to the turbo-molecular pump 1, but is not shown in FIG. 1.

The turbo-molecular pump 1 illustrated in FIG. 1 includes, as exhaust functions, a turbo pump portion P1 including turbine blades, and a Holweck pump portion P2 provided with a spiral groove. Although the turbo-molecular pump 1 will be described below as an example, the present invention is not limited to the vacuum pump including the turbo pump portion P1 and the Holweck pump portion P2 as the exhaust functions. The present invention is applicable to a vacuum pump including only turbine blades, a vacuum pump including only a drag pump such as a Siegbahn pump or a Holweck pump, or a combination thereof.

The turbo pump portion P1 includes a plurality of rotor blades 17 formed at a pump rotor 3, and a plurality of stationary blades 15 arranged on a base 2 and a pump case 12. The rotor blades 17 and the stationary blades 15 are alternately arranged in an axial direction. Each stationary blade 15 is fixed such that an outer peripheral edge thereof is sandwiched between spacers 5 arranged between the stationary blades 15. On the other hand, the Holweck pump portion P2 provided on an exhaust downstream side of the turbo pump portion P1 includes a cylindrical portion 18 formed at the pump rotor 3, and a stator 16 disposed on the base 2. A spiral groove is formed at an inner peripheral surface of the cylindrical stator 16. The plurality of rotor blades 17 and the cylindrical portion 18 form a rotary-side exhaust function, and the plurality of stationary blades 15 and the stator 16 form a stationary-side exhaust function.

The pump rotor 3 is fastened to a shaft 10 as a rotor shaft, and the shaft 10 is rotatably driven by a motor 4. For example, a DC brushless motor is used as the motor 4. A motor stator 4a is provided at the base 2, and a motor rotor 4b is provided at the shaft 10. A rotor unit R including the shaft 10 and the pump rotor 3 is rotatably supported by a permanent magnet magnetic bearing 6 using permanent magnets 6a, 6b and a bearing 30 as a rolling bearing. The bearing 30 is a component of a bearing device 100 described in detail with reference to FIG. 2.

Each of the permanent magnets 6a, 6b is a ring-shaped permanent magnet magnetized in the axial direction. The plurality of permanent magnets 6a provided at the pump rotor 3 is arranged in the axial direction such that the polarities of opposing ones of the permanent magnets 6a are the same as each other. On the other hand, the plurality of stationary-side permanent magnets 6b is attached to a magnet holder 11 fixed to the pump case 12. These permanent magnets 6b are also arranged in the axial direction such that the polarities of opposing ones of the permanent magnets 6b are the same as each other. The axial position of each permanent magnet 6a provided at the pump rotor 3 is set slightly higher than the position of a corresponding one of the permanent magnets 6b arranged on an inner peripheral side of the permanent magnet 6a. That is, the polarity of the rotary-side permanent magnet shifts, by a predetermined amount, in the axial direction with respect to the polarity of the stationary-side permanent magnet. Depending on the predetermined amount, the support force of the permanent magnet magnetic bearing 6 varies. In an example illustrated in FIG. 1, the permanent magnets 6a are arranged on the upper side as viewed in the figure, and therefore, support force in a radial direction and upward force in the axial direction (a direction toward a pump exhaust port) act on the rotor unit R due to repulsive force among the permanent magnets 6a, 6b.

A bearing holder 13 configured to hold a bearing 9 is fixed to the center of the magnet holder 11. For example, ball bearings such as deep groove ball bearings are used as the bearings 9, 30 in FIG. 1, but the present invention is not limited to these bearings. For example, angular contact bearings may be used. The bearing 9 functions as a touchdown bearing configured to restrict vibration of an upper portion of the shaft 10 in the radial direction. The shaft 10 and the bearing 9 do not contact each other in a steady rotation state, and the shaft 10 comes into contact with the bearing 9 when great disturbance is applied or when whirling of the shaft 10 becomes greater due to acceleration or deceleration of rotation.

The bearing 30 is housed in a bearing housing 40 fixed to the base 2. The bearing 30 is an oil lubricated rolling bearing. The bearing housing 40 has a substantially columnar internal space, and a lubricant storage 70 configured to supply lubricant to the bearing 30 is housed in the internal space. A lower cover 19 is, using a fastening member such as a bolt, fixed to a lower portion of the bearing housing 40. An external thread may be provided at an outer peripheral surface of the lower cover 19, and an internal thread may be provided at an inner peripheral surface of the base 2. The lower cover 19 may be fixed to the base 2 in such a manner that the external thread is screwed with the internal thread.

Figure 2:
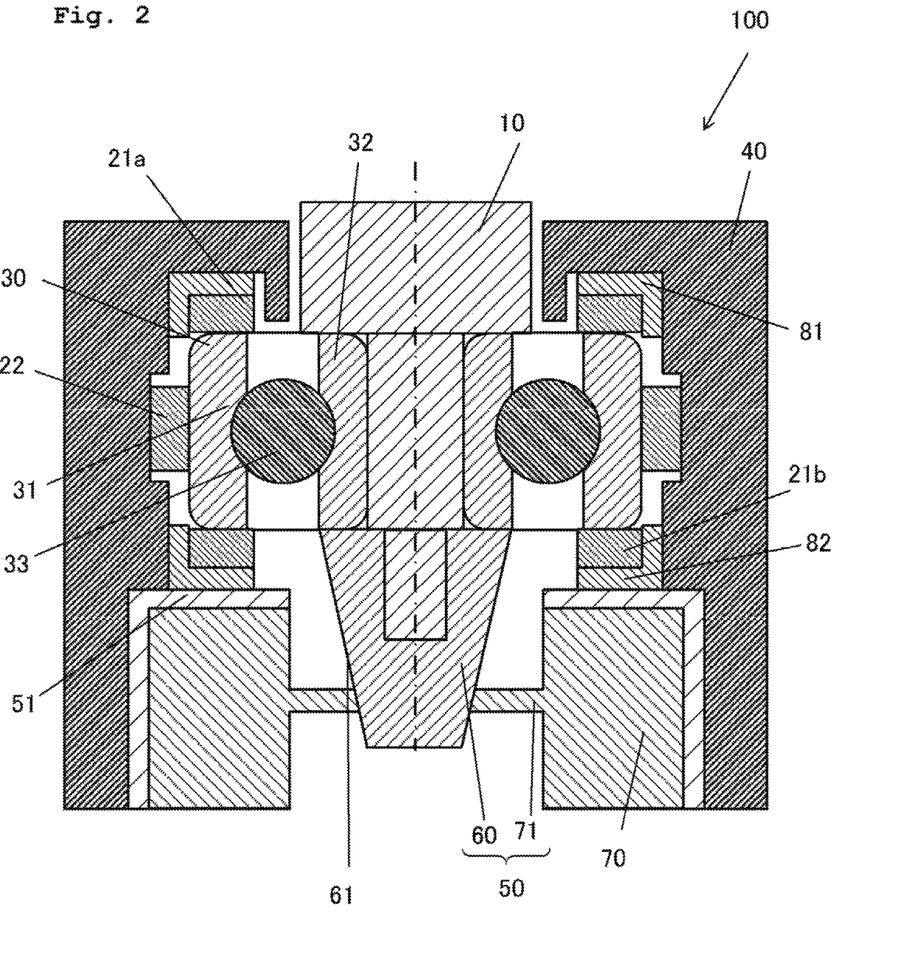
FIG. 2 is an enlarged view of a vacuum pump bearing device illustrated in FIG. 1.

FIG. 2 is an enlarged cross-sectional view of a main portion of the vacuum pump bearing device 100 of the present invention, i.e., a region II surrounded by a dashed line in FIG. 1. Note that the vacuum pump bearing device 100 will be hereinafter simply referred to as a "bearing device 100."

The bearing device 100 includes the bearing 30, the lubricant storage 70, a rotary body 60 for oil supply, thrust dampers 21a, 21b, a radial damper 22, porous members 81, 82, a liquid feeding wick 71, and the bearing housing 40 as holding members configured to hold the bearing 30 and a lubricant storage case 51.

The bearing 30 includes an outer ring 31, an inner ring 32, and rolling bodies 33. A lower end of the shaft 10 is fitted into the inner ring 32. The lower end of the shaft 10 is fixed to the bearing 30 in such a manner that the rotary body 60 is attached to the lower end of the shaft 10 protruding downward from the inner ring 32. The outer ring 31 of the bearing 30 is disposed on the lubricant storage case 51, and is fixed to the inside of the bearing housing 40 relative to the lower cover 19 fixed to the base 2.

The rotary body 60 is detachably attached to the lower end of the shaft 10 with the rotary body 60 being coaxial with the shaft 10. The rotary body 60 is a circular truncated conical member narrowed toward the lubricant storage 70 and having an inclined surface 61. Although not shown in the figure, the rotary body 60 is fixed to the shaft 10 in such a manner that an internal thread portion provided at an inner peripheral surface of the rotary body 60 is screwed with an external thread portion provided at an outer peripheral surface of a small-diameter shaft portion at a tip end portion of the shaft 10.

Each of the thrust dampers 21a, 21b is a discoid member provided, at the center thereof, with a through-hole having a larger diameter than that of the inner ring 32 of the bearing 30. The thrust dampers 21a, 21b are arranged respectively on both outer upper and lower sides of the outer ring 31 of the bearing 30 in the axial direction. That is, the thrust damper 21a is disposed on an upper surface of the outer ring 31 of the bearing 30 in the axial direction, i.e., a surface opposite to the lubricant storage 70, and the thrust damper 21b is disposed on a lower surface of the outer ring 31 of the bearing 30 in the axial direction, i.e., a surface close to the lubricant storage 70. Inner peripheral surfaces of the thrust dampers 21a, 21b are positioned between an inner peripheral surface of the outer ring 31 of the bearing 30 and an outer peripheral surface of the inner ring 32 of the bearing 30.

The radial damper 22 is a tubular member provided, at the center thereof, with a through-hole having the substantially same diameter as that of an outer peripheral surface of the bearing 30, and is disposed between the outer ring 31 of the bearing 30 and an outer peripheral surface of the internal space of the bearing housing 40. The radial damper 22 is disposed at substantially the center of the thickness of the bearing 30 in the axial direction thereof, and is provided such that an inner peripheral surface of the through-hole of the radial damper 22 contacts an outer peripheral surface of the outer ring 31 of the bearing 30.

The thrust dampers 21a, 21b and the radial damper 22 are made of metal or elastomer such as rubber.

The lubricant storage 70 is a lubricant holding member in the form of felt or sponge being able to hold lubricant, and is configured to hold lubricant. The lubricant storage 70 is formed in a cylindrical shape, and the liquid feeding wick 71 is provided at an inner peripheral surface of the lubricant storage 70. The liquid feeding wick 71 extends substantially horizontal from the lubricant storage 70 toward an outer peripheral surface of the rotary body 60. The liquid feeding wick 71 may be formed integrally with the lubricant storage 70, or may be formed as a member formed separately from the lubricant storage 70 and be coupled with the lubricant storage 70. The liquid feeding wick 71 is configured to supply, to the inclined surface 61 of the rotary body 60, lubricant held by the lubricant storage 70. That is, a tip end of the liquid feeding wick 71 is in rolling contact with the inclined surface 61 of the rotary body 60. The circular truncated conical rotary body 60 and the liquid feeding wick 71 form a lubricant supply structure 50.

When the motor 4 is driven to rotate the rotary body 60 at high speed together with the shaft 10, lubricant applied to the inclined surface 61 of the rotary body 60 by the liquid feeding wick 71 moves, due to action of centrifugal force, upward in the axial direction as the direction in which the diameter of the rotary body 60 increases, i.e., moves toward the bearing 30. With such movement of the lubricant applied to the inclined surface 61 of the rotary body 60, lubricant held by the lubricant storage 70 is continuously supplied to the inclined surface 61 of the rotary body 60 via the liquid feeding wick 71 by capillary action. The lubricant having moved upward in the axial direction on the inclined surface 61 of the rotary body 60 moves in the order of the inner ring 32, the rolling bodies 33, and the outer ring 31 of the bearing 30, and then, is supplied to the entirety of the inside of the bearing 30. As described above, the lubricant held by the lubricant storage 70 is supplied into the bearing 30 via the lubricant supply structure 50.

The porous members 81, 82 are arranged outside the outer ring 31 of the bearing 30.

Each of the porous members 81, 82 has a peripheral edge portion having a substantially L-shaped cross section. Such an L-shape includes a first portion and a second portion. The first portion has a discoid shape extending substantially vertical to the axial direction of the bearing 30, and is disposed outside the outer ring 31 in the axial direction thereof. The second portion has a cylindrical shape extending substantially vertical to the radial direction of the bearing 30, and is disposed outside the outer ring 31 in the radial direction thereof. The porous members 81, 82 arranged respectively on the upper and lower sides have the substantially same shape, and each have a substantially tray shape. Note that the cylindrical second portion of the porous member 81 extends toward the lubricant storage 70, and the cylindrical second portion of the porous member 82 extends in a direction opposite to extension of the second portion of the porous member 81. The first portion of the porous member 81 is disposed between an upper surface of the internal space of the bearing housing 40 and the thrust damper 21a, and the second portion of the porous member 81 is disposed between an inner peripheral surface of the internal space of the bearing housing 40 and an outer peripheral surface of the thrust damper 21a. That is, the porous member 81 covers the thrust damper 21a across the upper surface and the outer peripheral surface thereof.

The first portion of the porous member 82 is disposed between the lubricant storage case 51 and the thrust damper 21b, and the second portion of the porous member 82 is disposed between the inner peripheral surface of the internal space of the bearing housing 40 and an outer peripheral surface of the thrust damper 21b. That is, the porous member 82 covers the thrust damper 21b across the lower surface and the outer peripheral surface thereof. Inner peripheral surfaces of the porous members 81, 82 are each arranged at the substantially same position as that of a corresponding one of the inner peripheral surfaces of the thrust dampers 21a, 21b.

Since the porous members 81, 82 are provided outside the outer ring 31 of the bearing 30 as described above, lubricant supplied into the bearing 30 infiltrates, by capillary action, into pores of the porous members 81, 82 via the thrust dampers 21a, 21b, and therefore, these pores are filled with the lubricant. Then, the lubricant having infiltrated into each pore and having filled each pore forms a heat transfer path. Thus, heat generated in the bearing 30 is efficiently transferred to the bearing housing 40 and the lubricant storage case 51 via the porous members 81, 82. This can suppress an increase in the temperature of the bearing 30.

The stiffness of the structure including the porous members 81, 82, the bearing 30, and the thrust dampers 21a, 21b is preferably 100 to 1000 N/mm in the axial direction and 50 to 500 N/mm in the radial direction. With such stiffness, abnormal vibration of the rotor unit R can be reduced, and whirling can be reduced.

The porous members 81, 82 can be made of sintered metal formed from metal such as bronze or resin such as polyurethane or polyolefin. The porous members 81, 82 may be any of a body with closed pores and a body with interconnected pores. The case of the body with the interconnected pores is preferable because a heat transfer path continuously formed from the inside to the outside of the porous members 81, 82 is formed by lubricant having infiltrated into the pores of the porous members 81, 82. In particular, in the case where the porous members 81, 82 are made of resin such as polyurethane, the body with the interconnected pores is recommended.

In the case where the porous members 81, 82 are made of polyurethane, the density of interconnected pore type urethane foam formed with 50 to 100 pores/in may be increased to several times by hot pressing, and then, the resultant may be processed into a predetermined shape. The effect of improving an oil-bearing capacity is obtained by a density increase. A urethane material has the property of adhering to a metal surface, and therefore, a mesh structure formed by interconnected pores of urethane is fixed to connect the bearing housing 40 and the outer ring of the bearing 30. Thus, lubricant is movable in the mesh structure.

Preferably, the coefficient of thermal conductivity of the porous member 81, 82 is higher than that of the outer ring 31. This is for the following purpose: the porous members 81, 82 efficiently draw heat from the outer ring 31, and transfer the heat to the bearing housing 40 and the lubricant storage case 51. The outer ring 31 requires, as a bearing, high strength. For this reason, the outer ring 31 is made of a high-strength material such as iron or stainless steel, and cannot be made of aluminum or copper having an extremely high coefficient of thermal conductivity, but exhibiting poor strength. Thus, the porous members 81, 82 not requiring high strength as required for the outer ring 31 are made of sintered metal such as aluminum or copper having an extremely-high coefficient of thermal conductivity, and as a result, heat can be efficiently released.

According to the above-described first embodiment, the following advantageous effects are provided.

(1) In the turbo-molecular pump 1 configured to hold, using the oil-lubricated bearing 30, the pump rotor 3 rotating at high speed, it is configured such that the porous members 81, 82 are arranged outside the outer ring 31 of the bearing 30. The porous member 81 is, by thermal bonding, disposed between the bearing 30 and the inner periphery of the bearing housing 40, and the porous member 82 is, by thermal bonding, disposed between the bearing 30 and the lubricant storage case 51. In each of the porous members 81, 82, the heat transfer path is formed by the lubricant having infiltrated into the pores or having filled the pores. Thus, heat generated in the bearing 30 can be efficiently transferred to the bearing housing 40 and the lubricant storage case 51. Accordingly, an increase in the temperature of the bearing 30 can be suppressed.

(2) In the mesh structure formed by the pores, viscosity resistance acts on the lubricant having infiltrated into the pores of the porous members 81, 82. Thus, the effect of attenuating vibration of the bearing 30 is provided.

Second Embodiment

Figure 3:
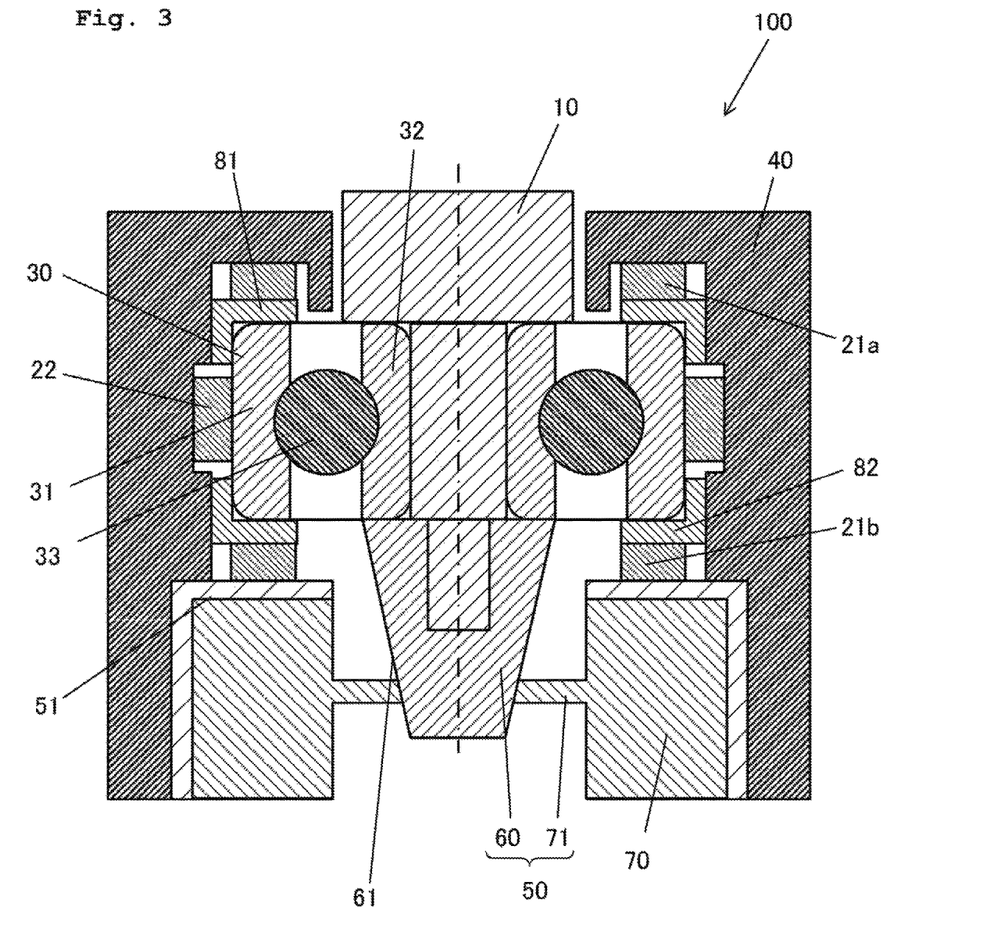
FIG. 3 is a view of a second embodiment of a vacuum pump including a vacuum pump bearing device different from that of FIG. 2.

FIG. 3 is a view of a second embodiment of a vacuum pump including a vacuum pump bearing device 100 having a structure different from that of FIG. 2.

In the second embodiment, the structure is made such that the order of stacking thrust dampers 21a, 21b and porous members 81, 82 on an outer ring 31 of a bearing 30 is opposite to that of the first embodiment.

That is, the porous member 81 is disposed above an upper surface of the outer ring 31 of the bearing 30, and the thrust damper 21a is disposed between the porous member 81 and an upper surface of an internal space of a bearing housing 40. Moreover, the porous member 82 is disposed below a lower surface of the outer ring 31 of the bearing 30, and the thrust damper 21b is disposed between the porous member 82 and a lubricant storage case 51. Each of the porous members 81, 82 covers the bearing 30 such that first and second portions forming a peripheral edge portion having an L-shaped cross section extend over the upper or lower surface and an outer peripheral surface of the outer ring 31 of the bearing 30.

Other structures in the second embodiment are similar to those of the first embodiment. The same reference numerals are used to represent equivalent members, and description thereof will not be repeated.

In the second embodiment, lubricant held by a lubricant storage 70 moves in a lubricant supply structure 50 including a liquid feeding wick 71 and a rotary body 60, and then, is supplied into the bearing 30. Subsequently, the lubricant is further supplied from the bearing 30 to the porous members 81, 82. The lubricant filtrates into the porous members 81, 82, and therefore, the porous members 81, 82 are filled with the lubricant. Thus, advantageous effects similar to those of the first embodiment are also provided in the second embodiment.

Third Embodiment

Figure 4:
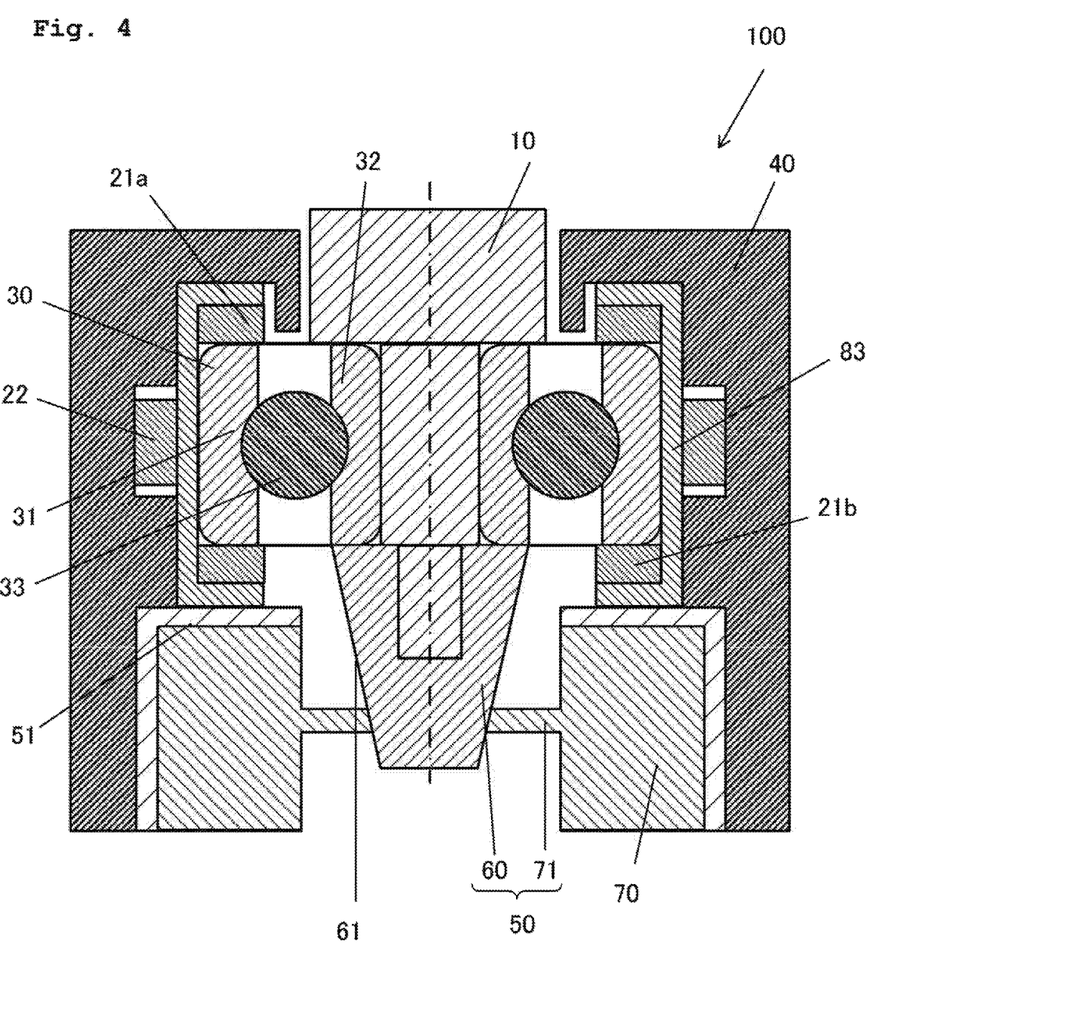
FIG. 4 is a view of a third embodiment of a vacuum pump including a vacuum pump bearing device different from that of FIG. 2.

FIG. 4 is a view of a third embodiment of a vacuum pump including a vacuum pump bearing device 100 having a structure different from that of FIG. 2.

The third embodiment has a structure with a porous member 83 configured such that the upper and lower porous members 81, 82 in a pair in the first embodiment are integrated together.

That is, the porous member 83 in the third embodiment has such a structure that the second portions of the porous members 81, 82 in the first embodiment are connected together. In other words, the porous member 83 has a peripheral side portion with a square bracket-shaped cross section, and has a substantially barrel shape provided with a circular through-hole at a center portion thereof. An inner peripheral surface of the porous member 83 is disposed to contact an outer peripheral surface of an outer ring 31 of a bearing 30. A radial damper 22 is provided such that an inner peripheral surface thereof contacts an outer peripheral surface of the porous member 83.

Other structures in the third embodiment are similar to those of the first embodiment. The same reference numerals are used to represent equivalent members, and description thereof will not be repeated.

In the third embodiment, lubricant held by a lubricant storage 70 moves in a lubricant supply structure 50 including a liquid feeding wick 71 and a rotary body 60, and then, is supplied into the bearing 30. Subsequently, the lubricant supplied into the bearing 30 is further supplied to the porous member 83 via thrust dampers 21a, 21b from the bearing 30. The lubricant filtrates into the porous member 83, and therefore, the porous member 83 is filled with the lubricant. Thus, advantageous effects similar to those of the first embodiment are also provided in the third embodiment.

Fourth Embodiment

Figure 5:
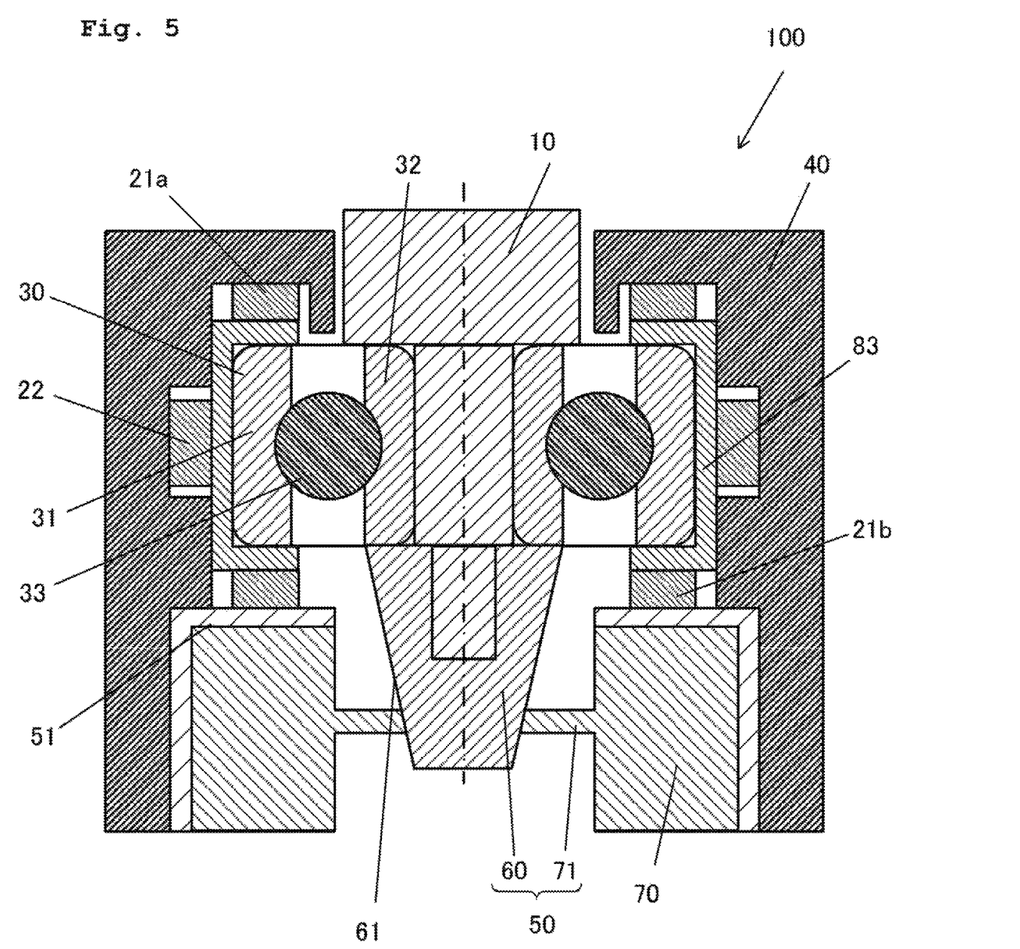
FIG. 5 is a view of a fourth embodiment of a vacuum pump including a vacuum pump bearing device different from that of FIG. 2.

FIG. 5 is a view of a fourth embodiment of a vacuum pump including a vacuum pump bearing device 100 having a structure different from that of FIG. 2.

In the fourth embodiment, the structure is made such that the order of stacking thrust dampers 21a, 21b and a porous member 83 on an outer ring 31 of a bearing 30 is opposite to that of the third embodiment.

That is, the porous member 83 is provided to cover an outer peripheral surface, an upper surface, and a lower surface of the outer ring 31 of the bearing 30. The thrust damper 21a is provided between an upper surface of the porous member 83 and an upper surface of an internal space of a bearing housing 40, and the thrust damper 21b is provided between a lower surface of the porous member 83 and a lubricant storage case 51.

Other structures in the fourth embodiment are similar to those of the third embodiment. The same reference numerals are used to represent equivalent members, and description thereof will not be repeated.

In the fourth embodiment, lubricant held by a lubricant storage 70 moves in a lubricant supply structure 50 including a liquid feeding wick 71 and a rotary body 60, and then, is supplied into the bearing 30. Subsequently, the lubricant supplied into the bearing 30 is further supplied from the bearing 30 to the porous member 83. The lubricant filtrates into the porous member 83, and therefore, the porous member 83 is filled with the lubricant. Thus, advantageous effects similar to those of the first embodiment are also provided in the fourth embodiment.

Note that in description with reference to FIGS. 3 to 5, the bearing devices 100 of the second to fourth embodiments are each illustrated such that vibration of the bearing 30 in a radial direction is blocked by the porous member 83. However, a predetermined clearance, i.e., a clearance allowing only vibration of the bearing 30 in the radial direction, is provided between the outer peripheral surface of the outer ring 31 and the inner peripheral surface of the porous member 83 and between the outer peripheral surface of the porous member 83 and the inner peripheral surface of the internal space of the bearing housing 40.

Fifth Embodiment

Figure 6:
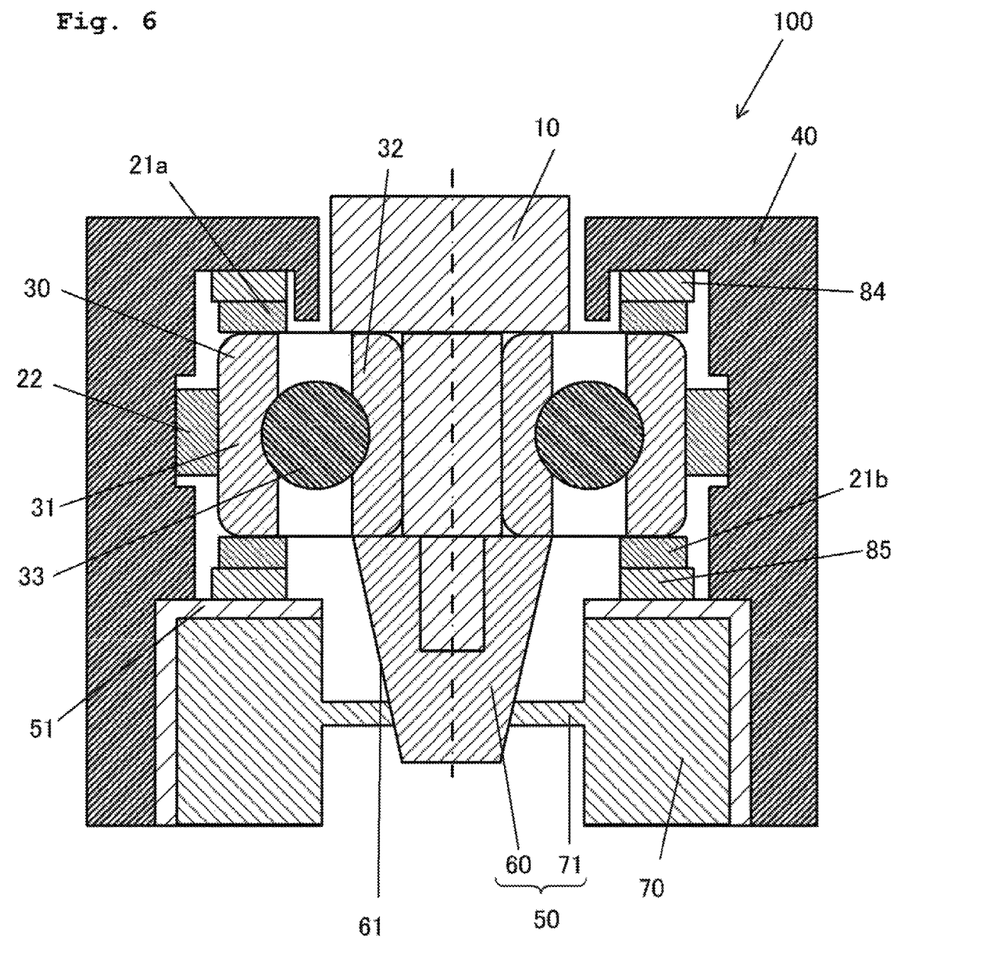
FIG. 6 is a view of a fifth embodiment of a vacuum pump including a vacuum pump bearing device different from that of FIG. 2.

FIG. 6 is a view of a fifth embodiment of a vacuum pump including a vacuum pump bearing device 100 having a structure different from that of FIG. 2.

In the fifth embodiment, the structure is made such that the porous members 81, 82 of the first embodiment are replaced with porous members 84, 85 each having only a discoid first portion extending substantially vertical to an axial direction.

That is, each of the porous members 84, 85 in the fifth embodiment does not have a second portion extending vertical to a radial direction, and has a thin ring shape provided with a circular through-hole at a center portion thereof.

Other structures in the fifth embodiment are similar to those of the first embodiment. The same reference numerals are used to represent equivalent members, and description thereof will not be repeated.

In the fifth embodiment, lubricant held by a lubricant storage 70 moves in a lubricant supply structure 50 including a liquid feeding wick 71 and a rotary body 60, and then, is supplied into a bearing 30. Subsequently, the lubricant supplied into the bearing 30 is further supplied from the bearing 30 to the porous members 84, 85 via thrust dampers 21a, 21b. The lubricant filtrates into the porous members 84, 85, and therefore, the porous members 84, 85 are filled with the lubricant. Thus, advantageous effects similar to those of the first embodiment are also provided in the fifth embodiment.

Sixth Embodiment

Figure 7:
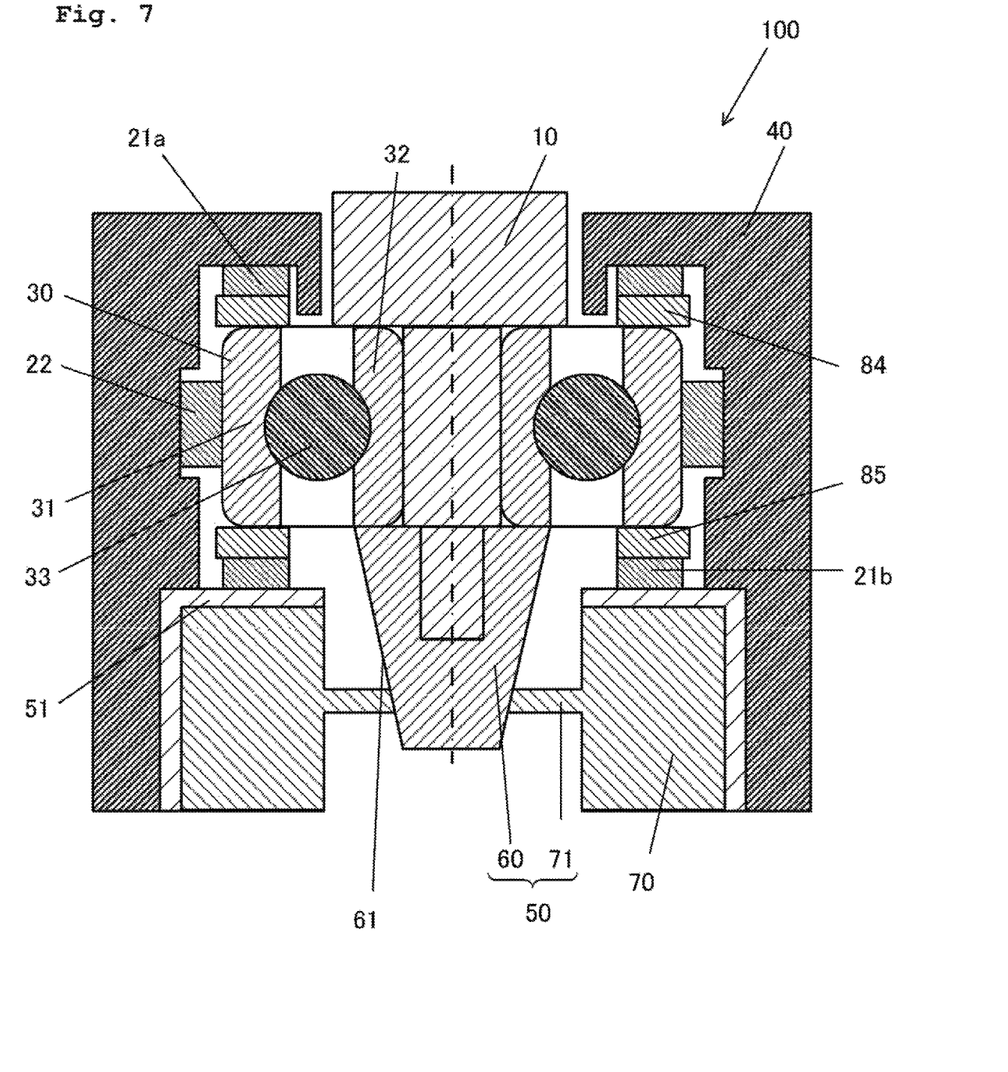
FIG. 7 is a view of a sixth embodiment of a vacuum pump including a vacuum pump bearing device different from that of FIG. 2.

FIG. 7 is a view of a sixth embodiment of a vacuum pump including a vacuum pump bearing device 100 having a structure different from that of FIG. 2.

In the sixth embodiment, the structure is made such that the order of stacking thrust dampers 21a, 21b and porous members 84, 85 on an outer ring 31 of a bearing 30 is opposite to that of the fifth embodiment.

That is, the porous member 84 is disposed above an upper surface of the outer ring 31 of the bearing 30, and the thrust damper 21a is disposed between the porous member 84 and an upper surface of an internal space of a bearing housing 40. Moreover, the porous member 85 is disposed below a lower surface of the outer ring 31 of the bearing 30, and the thrust damper 21b is disposed between the porous member 85 and a lubricant storage case 51.

Other structures in the sixth embodiment are similar to those of the fifth embodiment. The same reference numerals are used to represent equivalent members, and description thereof will not be repeated.

In the sixth embodiment, lubricant held by a lubricant storage 70 moves in a lubricant supply structure 50 including a liquid feeding wick 71 and a rotary body 60, and then, is supplied into the bearing 30. Subsequently, the lubricant supplied into the bearing 30 is further supplied from the bearing 30 to the porous members 84, 85. The lubricant filtrates into the porous members 84, 85, and therefore, the porous members 84, 85 are filled with the lubricant. Thus, advantageous effects similar to those of the first embodiment are also provided in the sixth embodiment.

Seventh Embodiment

Figure 8:
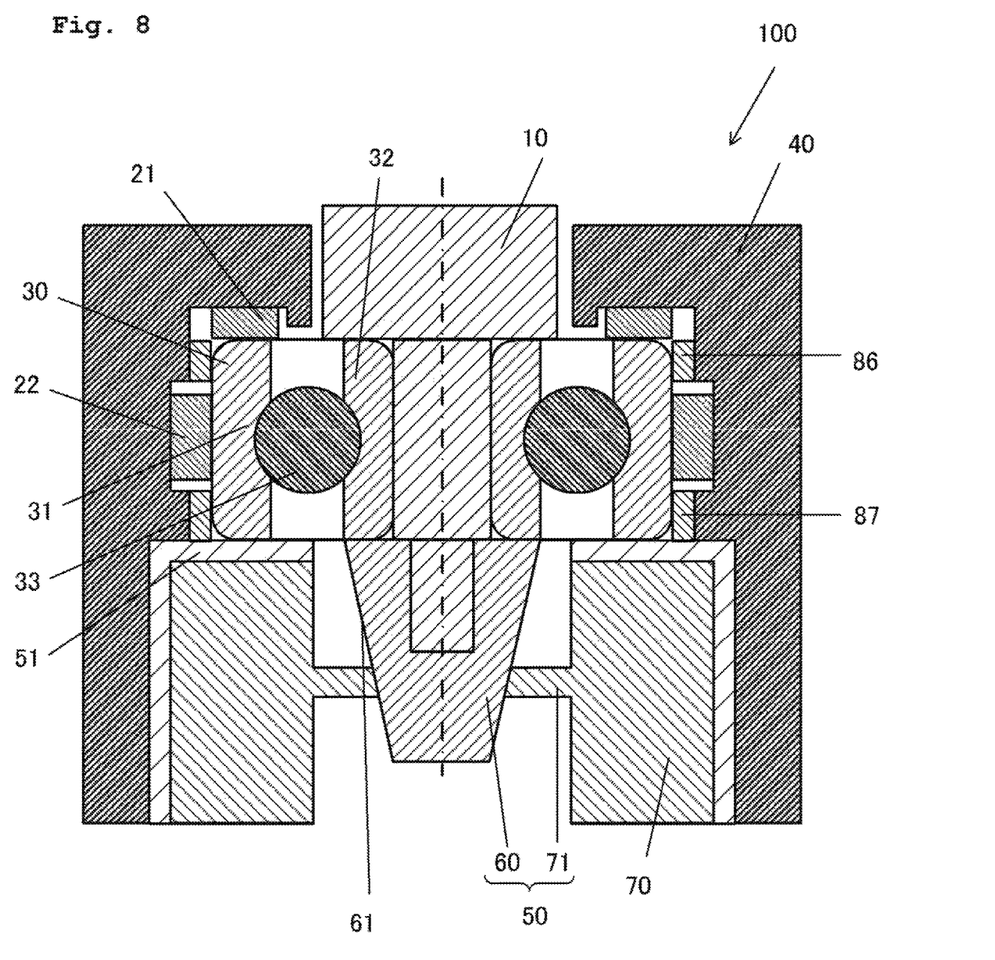
FIG. 8 is a view of a seventh embodiment of a vacuum pump including a vacuum pump bearing device different from that of FIG. 2.

FIG. 8 is a view of a seventh embodiment of a vacuum pump including a vacuum pump bearing device 100 having a structure different from that of FIG. 2.

The seventh embodiment has such a structure that porous members 86, 87 are arranged only on an outer side of a bearing 30 in a radial direction thereof.

That is, each of the porous members 86, 87 is formed as a ring-shaped member provided with a through-hole having an inner peripheral surface contacting an outer peripheral surface of an outer ring 31 of the bearing 30. The porous member 86 is, on an upper side of the bearing 30 in an axial direction, disposed between the outer peripheral surface of the outer ring 31 of the bearing 30 and an outer peripheral surface of an internal space of a bearing housing 40, and the porous member 87 is, on a lower side of the bearing 30 in the axial direction, disposed between the outer peripheral surface of the outer ring 31 of the bearing 30 and the outer peripheral surface of the internal space of the bearing housing 40. In the vacuum pump bearing device 100 of the seventh embodiment, no porous members arranged in the axial direction are provided. Moreover, a thrust damper 21 is only provided between the outer ring 31 of the bearing 30 and an upper surface of the internal space of the bearing housing 40, and no thrust damper is provided between the outer ring 31 of the bearing 30 and a lubricant storage case 51. In a turbo-molecular pump 1 of the present embodiment, a pump rotor 3 and a shaft 10 are together levitated upward in the axial direction by repulsive force among the permanent magnets 6a, 6b, and for this reason, the above-described structure can be made. Note that in the first to sixth embodiments, the structure can be also made, as in the seventh embodiment, such that no thrust damper is provided between the outer ring 31 of the bearing 30 and the lubricant storage case 51.

Other structures in the seventh embodiment are similar to those of the first embodiment. The same reference numerals are used to represent equivalent members, and description thereof will not be repeated.

In the seventh embodiment, lubricant held by a lubricant storage 70 moves in a lubricant supply structure 50 including a liquid feeding wick 71 and a rotary body 60, and then, is supplied into the bearing 30. Subsequently, the lubricant supplied into the bearing 30 is further supplied from the bearing 30 to the porous members 86, 87. The lubricant filtrates into the porous members 86, 87, and therefore, the porous members 86, 87 are filled with the lubricant. Thus, advantageous effects similar to those of the first embodiment are also provided in the seventh embodiment.

Eighth Embodiment

Figure 9:
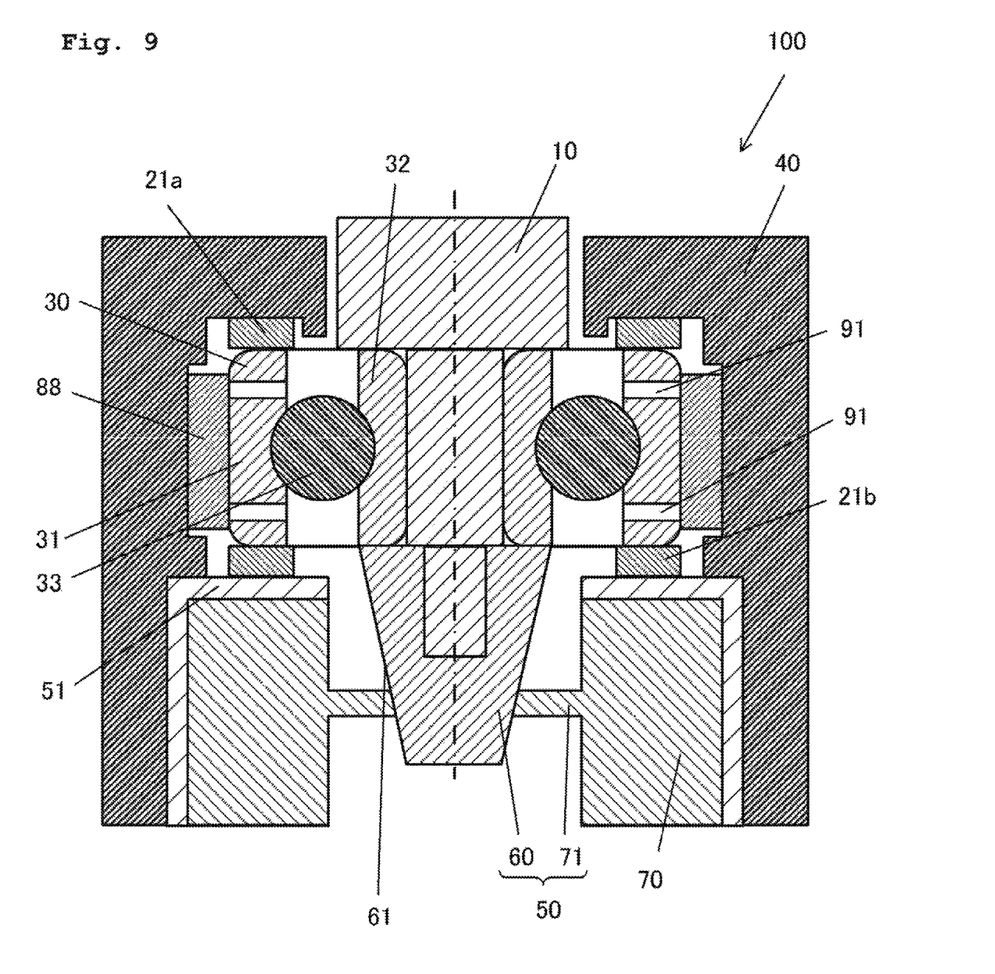
FIG. 9 is a view of an eighth embodiment of a vacuum pump including a vacuum pump bearing device different from that of FIG. 2.

FIG. 9 is a view of an eighth embodiment of a vacuum pump including a vacuum pump bearing device 100 having a structure different from that of FIG. 2.

The eighth embodiment has such a structure that a plurality of oil discharge paths 91 is formed at an outer ring 31 of a bearing 30.

The eighth embodiment has, as in the seventh embodiment, such a structure that a porous member 88 is disposed only on an outer side of the bearing 30 in a circular direction. Note that unlike the seventh embodiment, the porous member 88 has such a structure that the porous members 86, 87 of the seventh embodiment are integrated together in the eighth embodiment. That is, the porous member 88 is disposed between an outer peripheral surface of the outer ring 31 of the bearing 30 and an outer peripheral surface of an internal space of a bearing housing 40, and has a cylindrical shape extending in an axial direction. Moreover, in the eighth embodiment, thrust dampers 21a, 21b are provided respectively on upper and lower sides of the outer ring 31 of the bearing 30. Note that a radial damper 22 is not provided, but the effect of reducing vibration of the bearing 30 in a radial direction can be provided by the porous member 88.

Other structures in the eighth embodiment are similar to those of the seventh embodiment. The same reference numerals are used to represent equivalent members, and description thereof will not be repeated.

The plurality of oil discharge paths 91 penetrating from an inner peripheral surface to the outer peripheral surface of the outer ring 31 is provided at the bearing 30 of the eighth embodiment. Of lubricant supplied into the bearing 30 after having moved from a lubricant storage 70 to a liquid feeding wick 71 and a rotary body 60, excess lubricant is, in this structure, supplied to the porous member 88 through the oil discharge paths 91, and then, filtrates into the porous member 88. Thus, advantageous effects similar to those of the first embodiment are also provided in the eighth embodiment. Particularly in the eighth embodiment, the lubricant easily moves to the porous member 88 through the oil discharge paths 91 formed at the outer ring 31 of the bearing 30, and therefore, the amount of lubricant supplied to the bearing 30 can be more easily minimized. A greater amount of lubricant supplied to the bearing 30 results in more unnecessary heat generation due to lubricant agitation. With the minimum amount of lubricant, such unnecessary heat generation can be reduced, and favorable lubrication can be maintained.

Note that in the first to seventh embodiments, the structure may be made such that the oil discharge paths 91 are provided at the outer ring 31 of the bearing 30.

Ninth Embodiment

Figure 10:
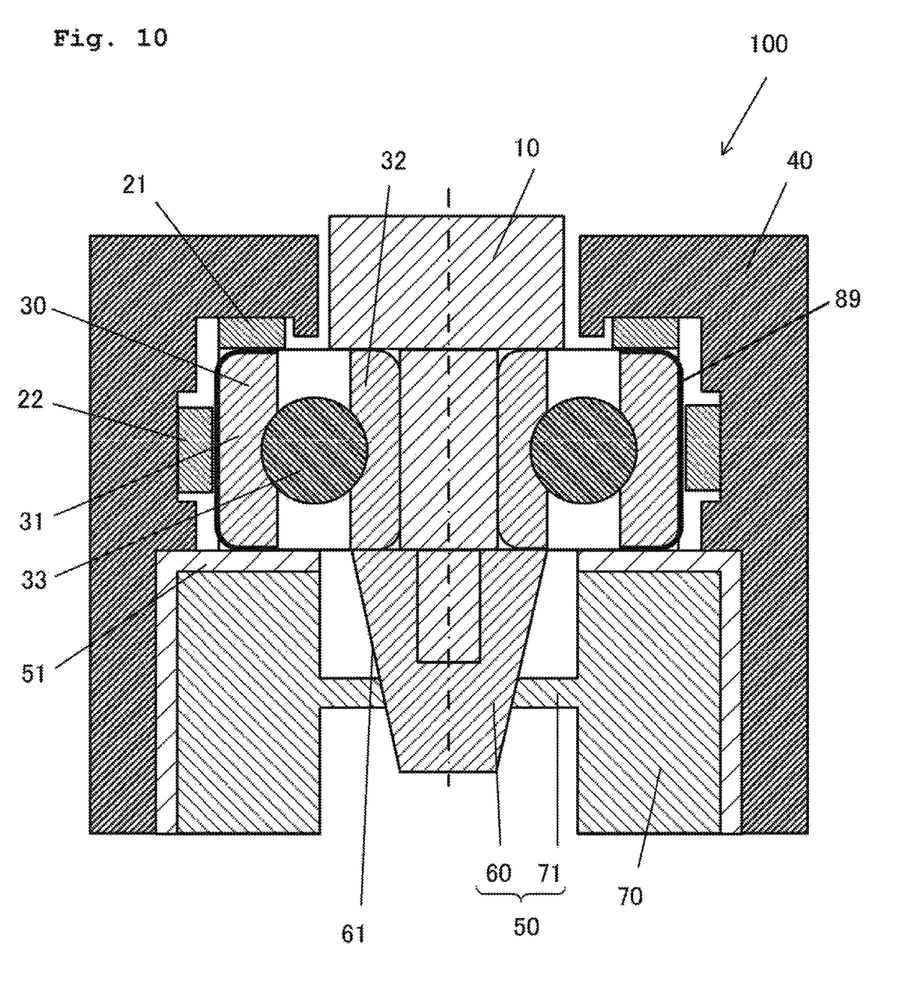
FIG. 10 is a view of a ninth embodiment of a vacuum pump including a vacuum pump bearing device different from that of FIG. 2.

FIG. 10 is a view of a ninth embodiment of a vacuum pump including a vacuum pump bearing device 100 having a structure different from that of FIG. 2.

The ninth embodiment has such a feature that a porous body is formed as a porous coating 89.

The porous coating 89 is formed as a plating film, for example. For forming the porous body from plating, electrolytic plating is performed after an additive agent for porous electrolytic plating has been added to a plating solution, for example.

As illustrated in FIG. 10, the porous coating 89 is formed on an outer surface of an outer ring 31 of a bearing 30, i.e., an outer peripheral surface and upper and lower surfaces of the outer ring 31 of the bearing 30. A thrust damper 21 is disposed between the porous coating 89 formed on the upper surface of the bearing 30 and an upper surface of an internal space of a bearing housing 40. A radial damper 22 is disposed between the porous coating 89 formed on the outer peripheral surface of the outer ring 31 of the bearing 30 and an outer peripheral surface of the internal space of the bearing housing 40.

The same reference numerals as those of other embodiments are used to represent equivalent members in the ninth embodiment.

In the ninth embodiment, lubricant held by a lubricant storage 70 moves in a lubricant supply structure 50 including a liquid feeding wick 71 and a rotary body 60, and then, is supplied into the bearing 30. Subsequently, the lubricant supplied into the bearing 30 is further supplied from the bearing 30 to the porous coating 89. The lubricant filtrates into the porous coating 89, and therefore, the porous coating 89 is filled with the lubricant. Thus, heat generated in the bearing 30 is transferred to the bearing housing 40 through the porous coating 89 and the thrust damper 21, and is efficiently transferred to a lubricant storage case 51 through the porous coating 89. Thus, advantageous effects similar to those of the first embodiment are also provided in the ninth embodiment. Moreover, according to the ninth embodiment, the porous coating 89 is made of plating. Thus, the number of components is reduced, and assembly of a turbo-molecular pump 1 can be efficiently performed.

Note that in the ninth embodiment, the configuration in which the porous coating 89 is provided on the outer ring 31 of the bearing 30 has been described as an example. However, the porous coating 89 may be formed on an inner peripheral surface or the upper surface of the internal space of the bearing housing 40. In this case, the porous coating 89 is not necessarily formed across the entirety of the outer surface of the outer ring 31 of the bearing 30, and may be provided on part of the outer ring 31 of the bearing 30, such as the outer peripheral surface, the upper surface, or the lower surface of the outer ring 31 of the bearing 30. In the case of providing the porous coating 89 on the bearing housing 40, the porous coating 89 is not necessarily provided across all surfaces facing the outer ring 31 of the bearing 30, and may be provided on some of the surfaces facing the outer ring 31 of the bearing 30.

The porous members 81 to 88 in the first to eighth embodiments can be replaced with the porous coating 89 described in the ninth embodiment. Note that in the present specification, the porous body is interpreted as a term including the porous members 81 to 88 and the porous coating 89.

The pair of axially-arranged upper and lower porous members 81, 82, the pair of axially-arranged upper and lower porous members 84, 85, and the pair of axially-arranged upper and lower porous members 86, 87 as described as examples in the above-described embodiments have been described as the substantially same members. However, these members may be members having different thicknesses, sizes, etc. Alternatively, the pair of upper and lower members may be, as in, e.g., the porous members 81, 85, a combination of members having totally different shapes.

Various embodiments and variations have been described above, but the present invention is not limited to these contents. For example, the turbo-molecular pump has been described as an example in the above-described embodiments. However, the present invention is not limited to the turbo-molecular pump, but is applicable to various vacuum pumps. Other aspects conceivable within the scope of the technical idea of the present invention are included in the scope of the present invention.

What is claimed is:

1. A vacuum pump comprising:
   a bearing device; and
   an exhaust function including a rotary body supported by the bearing device and configured to exhaust gas,
   wherein the bearing device includes
   a bearing having an outer ring, an inner ring, and a rolling body,
   a lubricant storage configured to store lubricant,
   a lubricant supply structure configured to supply, to the bearing, the lubricant stored in the lubricant storage,
   a holding member configured to hold the bearing, and
   a porous body disposed outside the outer ring of the bearing and filled with the lubricant supplied from the lubricant supply structure to the bearing.

2. The vacuum pump according to claim 1, wherein the porous body includes at least one of
   a first portion disposed outside the outer ring of the bearing in an axial direction thereof, or
   a second portion disposed outside the outer ring in a radial direction thereof.

3. The vacuum pump according to claim 1, wherein the porous body includes an interconnected pore, and
   a heat transfer path continuously formed from an inner surface to an outer surface of the porous body is formed by the lubricant filling the interconnected pore.

4. The vacuum pump according to claim 1, wherein the porous body is made of a material having a higher coefficient of thermal conductivity than that of the outer ring of the bearing.

5. The vacuum pump according to claim 1, further comprising:
   one or more dampers provided between the outer ring of the bearing and the holding member,
   wherein a stiffness of a structure including the porous body, the bearing, and the damper is 100 to 1000 N/mm in the axial direction and 50 to 500 N/mm in the radial direction.

6. The vacuum pump according to claim 1, wherein the porous body includes a porous coating provided on at least one of at least part of an outer surface of the outer ring of the bearing or at least part of a surface of the holding member facing the outer ring of the bearing.

7. The vacuum pump according to claim 1, wherein a plurality of oil discharge paths are formed at the outer ring of the bearing.

8. The vacuum pump according to claim 1, wherein the porous body is made of sintered metal.

9. The vacuum pump according to claim 3, wherein the porous body is made of polyurethane, and
   the porous body is made in such a manner that the density of interconnected pore type urethane foam formed with 50 to 100 pores/in is increased to several times by hot pressing, and then, the resultant is processed into a predetermined shape.

* * * * *

(12) EX PARTE REEXAMINATION CERTIFICATE (11620th)
United States Patent
Manabe

(10) Number: US 10,006,492 C1
(45) Certificate Issued: Jan. 3, 2020

(54) VACUUM PUMP

(71) Applicant: Shimadzu Corporation, Kyoto (JP)

(72) Inventor: Masashi Manabe, Kyoto (JP)

(73) Assignee: SHIMADZU CORPORATION, Nakagyo-Ku, Kyoto-Shi, Kyoto (JP)

Reexamination Request:
No. 90/014,352, Aug. 2, 2019

Reexamination Certificate for:
Patent No.: 10,006,492
Issued: Jun. 26, 2018
Appl. No.: 15/425,199
Filed: Feb. 6, 2017

(30) Foreign Application Priority Data

Feb. 9, 2016 (JP) .................. 2016-022933

(51) Int. Cl.
*F04D 29/66* (2006.01)
*F04D 19/04* (2006.01)
*F16C 19/16* (2006.01)
*F16C 33/66* (2006.01)
*F04D 29/059* (2006.01)
*F16C 19/06* (2006.01)
*F04D 29/063* (2006.01)

(52) U.S. Cl.
CPC ......... *F04D 29/668* (2013.01); *F04D 19/042* (2013.01); *F04D 29/059* (2013.01); *F04D 29/063* (2013.01); *F16C 19/16* (2013.01); *F16C 33/6648* (2013.01); *F16C 33/6659* (2013.01); *F16C 33/6685* (2013.01); *F16C 19/06* (2013.01); *F16C 2202/10* (2013.01); *F16C 2360/45* (2013.01)

(58) Field of Classification Search
None
See application file for complete search history.

(56) References Cited

To view the complete listing of prior art documents cited during the proceeding for Reexamination Control Number 90/014,352, please refer to the USPTO's public Patent Application Information Retrieval (PAIR) system under the Display References tab.

*Primary Examiner* — William C Doerrler

(57) ABSTRACT

A vacuum pump comprises: a bearing device; and an exhaust function including a rotary body supported by the bearing device and configured to exhaust gas. The bearing device includes a bearing having an outer ring, an inner ring, and a rolling body, a lubricant storage configured to store lubricant, a lubricant supply structure configured to supply, to the bearing, the lubricant stored in the lubricant storage, a holding member configured to hold the bearing, and a porous body disposed outside the outer ring of the bearing and filled with the lubricant supplied from the lubricant supply structure to the bearing.

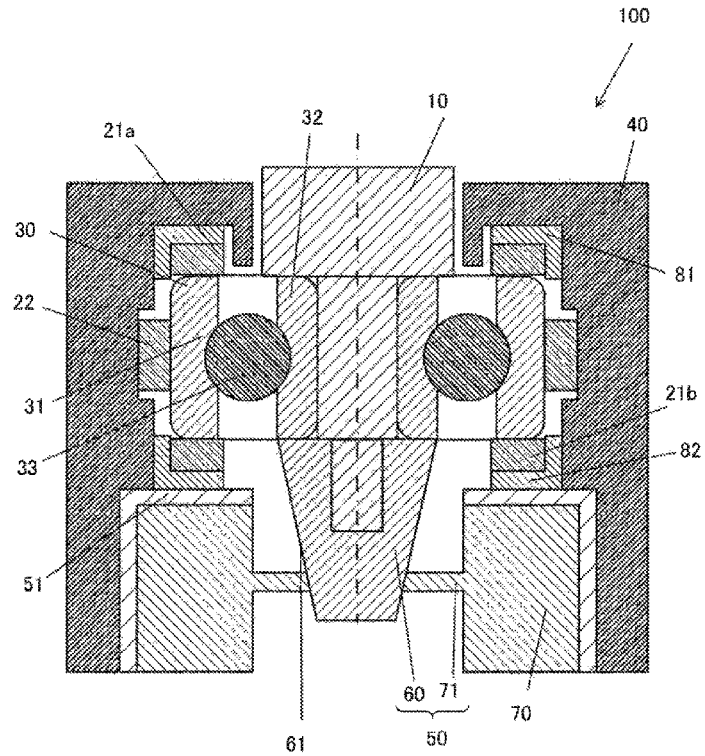

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-5, 7 and 8, dependent on an amended claim, are determined to be patentable.

New claims 10 and 11 are added and determined to be patentable.

Claims 6 and 9 were not reexamined.

1. A vacuum pump comprising:
   a bearing device; and
   an exhaust function including a rotary body supported by the bearing device and configured to exhaust gas, wherein the bearing device includes
   a bearing having an outer ring, an inner ring, and a rolling body,
   a lubricant storage configured to store lubricant,
   a lubricant supply structure configured to supply, to the bearing, the lubricant stored in the lubricant storage,
   a holding member configured to hold the bearing, and
   a porous body disposed outside the outer ring of the bearing and filled with the lubricant supplied from the lubricant supply structure to the bearing, *wherein the porous body filled with the lubricant makes heat generated in the bearing be transferred to the outside of the bearing, and*
   *the porous body filled with the lubricant is not directly contacted with the lubricant storage.*

*10. The vacuum pump according to claim 3, wherein the porous body is made of polyurethane, the interconnected pores form a mesh structure and the lubricant is movable in the mesh structure.*

*11. The vacuum pump according to claim 4, wherein the outer ring of the bearing is formed of iron or stainless steel and the porous body is made of aluminum or copper.*

\* \* \* \* \*